Aug. 21, 1928.
T. A. GANNON
1,681,531
MEANS FOR DEODORIZING COOKING
Filed Dec. 30, 1926
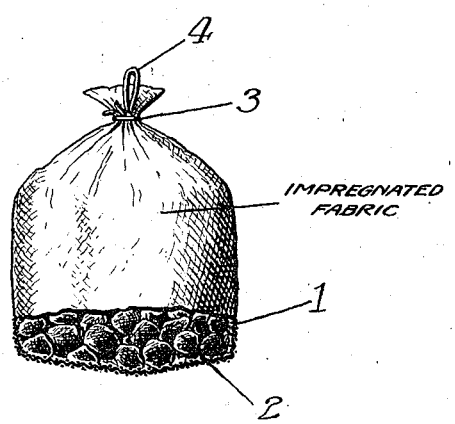
Witness
Martin H. Olsen.
Inventor
Thomas A. Gannon
By Rector Hibben Davis + Macauley
Atty's.

Patented Aug. 21, 1928.

1,681,531

UNITED STATES PATENT OFFICE.

THOMAS A. GANNON, OF CHICAGO, ILLINOIS.

MEANS FOR DEODORIZING COOKING.

Application filed December 30, 1926. Serial No. 157,961.

My invention provides, as an article of manufacture, a packet adapted for use, primarily, in the cooking of foods and serving to prevent the emanation of unpleasant odors that otherwise would occur and also, especially in the boiling of green vegetables, to preserve or enhance their attractive color. To these ends it consists in the features hereinafter set forth and claimed, reference being made to the accompanying drawing illustrating a preferred embodiment of my invention.

In the single figure of said drawing, 1 represents a fabric bag, preferably made of cotton cloth, filled with a charcoal mass 2 and securely closed to retain the same, the bag-tie 3 being preferably a spring provided with a hanging loop 4 by which it may be suspended in a pot or oven. A packet of substantially the size shown is suitable for household use in boiling vegetables or meat for a family, but the size may be varied according to the desired gas adsorption capacity. The fabric of the bag is impregnated with a material that is inert to the charcoal, is soluble in water and is preservative of vegetable coloration when dissolved in the water wherein vegetables are being boiled, bicarbonate of soda being the preferred color preservative.

In constructing the article, I preferably treat the fabric bag by immersing it in a bicarbonate of soda solution and then permitting it to dry, before filling the same with charcoal. The charcoal should be fresh and not long "weathered," and preferably is in granular form with the pieces all large enough to prevent any possibility of escape through the meshes of the bag, and thoroughly cleaned. The impregnated bag investing the charcoal mass is both sanitary and effective in preventing either the hands of the user or the food being cooked from coming into direct contact with the charcoal.

In use the packet may be merely dropped into the container in which the food is to be boiled, or it may be suspended in partly immersed condition by any suitable hook engaging the cooking vessel and the hanging loop 4. The bicarbonate of soda, dissolving in the cooking-water, has color preservative effect, and the carbon, by virtue of its capacity for adsorption of gases of many times the volumetric measurement of the carbon bulk, is very effective in preventing the dissemination of the cooking odors which would otherwise be given off in the boiling of the food. The bicarbonate of soda, being nongasifying, does not reduce the capacity of the carbon for adsorption of the odorous gases, and the carbon employed should preferably be of fine high porosity giving, in its pores, a maximum area for gas adsorption.

I claim:

1. As an article of manufacture, a deodorizing packet comprising a mass of carbon having high gas adsorbing capacity, and a fabric container investing the same, the fabric of said container being impregnated with a water-soluble preservative of vegetable colors.

2. As an article of manufacture, a deodorizing packet comprising a fabric bag the fabric whereof is impregnated with bicarbonate of soda, a mass of carbon grains filling said bag, the grains being larger than the fabric-mesh, and a tie for the bag formed into a hanging-loop.

In testimony whereof, I have subscribed my name.

THOMAS A. GANNON.